US011829276B1

(12) United States Patent
Chhabriya et al.

(10) Patent No.: US 11,829,276 B1
(45) Date of Patent: Nov. 28, 2023

(54) SYSTEM AND METHOD FOR MONITORING COMPLIANCE PATTERNS

(71) Applicant: Cadence Design Systems, Inc., San Jose, CA (US)

(72) Inventors: Kunal Amar Chhabriya, San Jose, CA (US); Roque Alejandro Arcudia Hernandez, San Jose, CA (US); Xin Mu, Redwood City, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 26 days.

(21) Appl. No.: 17/678,130

(22) Filed: Feb. 23, 2022

(51) Int. Cl.
*G06F 11/34* (2006.01)
*G06F 13/42* (2006.01)
*G06F 11/22* (2006.01)

(52) U.S. Cl.
CPC .......... *G06F 11/349* (2013.01); *G06F 11/221* (2013.01); *G06F 13/4221* (2013.01); *G06F 2213/0026* (2013.01)

(58) Field of Classification Search
CPC .. G06F 11/349; G06F 11/221; G06F 13/4221; G06F 2213/0026
See application file for complete search history.

(56) References Cited

U.S. PATENT DOCUMENTS

| 2010/0153799 | A1* | 6/2010 | Maroni | G06F 11/2733 714/E11.17 |
| 2012/0317446 | A1* | 12/2012 | Jaramillo | G06F 11/221 714/43 |
| 2019/0044760 | A1* | 2/2019 | Chiang | H04L 25/03343 |
| 2022/0318094 | A1* | 10/2022 | Jeon | G06F 13/4295 |

* cited by examiner

*Primary Examiner* — Glenn A. Auve
(74) *Attorney, Agent, or Firm* — Mark Whittenberger, Esq.; Holland & Knight LLP

(57) ABSTRACT

Embodiments include herein are directed towards a system and method for monitoring compliance patterns. Embodiments may include a re-timer device-under-test configured to transmit a truncated compliance pattern associated with a PCIe compliance mode. Embodiments may further include a BFM monitor configured to receive the truncated compliance pattern and to identify a communication signal associated with the truncated compliance pattern. The BFM monitor may be further configured to discard at least one unexpected symbol on at least one lane associated with the communication signal and to collect compliance patterns on all lanes of the communication signal. The BFM monitor may be further configured to align one or more lane FIFOs based upon skew and to enable one or more compliance pattern checkers.

20 Claims, 20 Drawing Sheets

700

| Symbol | K28.5 | D21.5 | K28.5 | D10.2 |
|---|---|---|---|---|
| Current Disparity | Negative | Positive | Positive | Negative |
| Pattern | 0011111010 | 1010101010 | 1100000101 | 0101010101 |
| Symbol | COM | 85h | COM | 4Ah |

FIG. 7A

| Symbol: | D | D | K28.5 | D21.5 | K28.5 | D10.2 | D | D |
|---|---|---|---|---|---|---|---|---|

| | | | | | | | | | | | | |
|---|---|---|---|---|---|---|---|---|---|---|---|---|
| Lane 0 | D | D | K28.5- | D21.5 | K28.5+ | D10.2 | D | D | K28.5- | D21.5 | K28.5+ | D10.2 |
| Lane 1 | K28.5- | D21.5 | K28.5+ | D10.2 | K28.5- | D21.5 | K28.5+ | D10.2 | D | D | K28.5- | D21.5 |
| Lane 2 | K28.5- | D21.5 | K28.5+ | D10.2 | K28.5- | D21.5 | K28.5+ | D10.2 | K28.5- | D21.5 | K28.5+ | D10.2 |
| Lane 3 | K28.5- | D21.5 | K28.5+ | D10.2 | K28.5- | D21.5 | K28.5+ | D10.2 | K28.5- | D21.5 | K28.5+ | D10.2 |
| Lane 4 | K28.5- | D21.5 | K28.5+ | D10.2 | K28.5- | D21.5 | K28.5+ | D10.2 | K28.5- | D21.5 | K28.5+ | D10.2 |
| Lane 5 | K28.5- | D21.5 | K28.5+ | D10.2 | K28.5- | D21.5 | K28.5+ | D10.2 | K28.5- | D21.5 | K28.5+ | D10.2 |
| Lane 6 | K28.5- | D21.5 | K28.5+ | D10.2 | K28.5- | D21.5 | K28.5+ | D10.2 | K28.5- | D21.5 | K28.5+ | D10.2 |
| Lane 7 | K28.5- | D21.5 | K28.5+ | D10.2 | K28.5- | D21.5 | K28.5+ | D10.2 | K28.5- | D21.5 | K28.5+ | D10.2 |
| Lane 8 | D | D | K28.5- | D21.5 | K28.5+ | D10.2 | D | D | K28.5- | D21.5 | K28.5+ | D10.2 |
| Lane 9 | K28.5- | D21.5 | K28.5+ | D10.2 | K28.5- | D21.5 | K28.5+ | D10.2 | D | D | K28.5- | D21.5 |
| Lane 10 | K28.5- | D21.5 | K28.5+ | D10.2 | K28.5- | D21.5 | K28.5+ | D10.2 | K28.5- | D21.5 | K28.5+ | D10.2 |
| Lane 11 | K28.5- | D21.5 | K28.5+ | D10.2 | K28.5- | D21.5 | K28.5+ | D10.2 | K28.5- | D21.5 | K28.5+ | D10.2 |

| Symbol | K28.5 | D21.5 | K28.5 | D10.2 | ERR | ERR | K28.5 | K28.5 |
|---|---|---|---|---|---|---|---|---|
| Current Disparity | Negative | Positive | Positive | Negative | Appropriate | Appropriate | Negative | Positive |
| Pattern | 0011111010 | 1010101010 | 1100000101 | 0101010101 | Any D | Any D | 0011111010 | 1100000101 |
| Byte | COM | 85h | COM | 4Ah | ERR | ERR | COM | COM |

FIG. 9A

| Error Status Symbol | |
|---|---|
| Pattern Lock (Bit 7) | Receiver Error Count (Bits 6:0) |
| Asserted when the Lane locks to the incoming MCP | Asserted when the Lane locks to the incoming Modified Compliance Pattern |

| Lane | | | | | | | | | | | | | | | | | |
|---|---|---|---|---|---|---|---|---|---|---|---|---|---|---|---|---|---|
| Lane0 | D | D | D | D | K28.5- | D21.5 | K28.5+ | D10.2 | ERR | ERR | K28.5- | K28.5+ | K28.7- | K28.7- | K28.7- | K28.7- | K28.5- | D21.5 |
| Lane1 | K28.5- | D21.5 | K28.5+ | D10.2 | ERR | ERR | K28.5- | K28.5+ | K28.5- | D21.5 | K28.5+ | D10.2 | ERR | ERR | K28.5- | K28.5+ | D | D |
| Lane2 | K28.5- | D21.5 | K28.5+ | D10.2 | ERR | ERR | K28.5- | K28.5+ | K28.5- | D21.5 | K28.5+ | D10.2 | ERR | ERR | K28.5- | K28.5+ | K28.5- | D21.5 |
| Lane3 | K28.5- | D21.5 | K28.5+ | D10.2 | ERR | ERR | K28.5- | K28.5+ | K28.5- | D21.5 | K28.5+ | D10.2 | ERR | ERR | K28.5- | K28.5+ | K28.5- | D21.5 |
| Lane4 | K28.5- | D21.5 | K28.5+ | D10.2 | ERR | ERR | K28.5- | K28.5+ | K28.5- | D21.5 | K28.5+ | D10.2 | ERR | ERR | K28.5- | K28.5+ | K28.5- | D21.5 |
| Lane5 | K28.5- | D21.5 | K28.5+ | D10.2 | ERR | ERR | K28.5- | K28.5+ | K28.5- | D21.5 | K28.5+ | D10.2 | ERR | ERR | K28.5- | K28.5+ | K28.5- | D21.5 |
| Lane6 | K28.5- | D21.5 | K28.5+ | D10.2 | ERR | ERR | K28.5- | K28.5+ | K28.5- | D21.5 | K28.5+ | D10.2 | ERR | ERR | K28.5- | K28.5+ | K28.5- | D21.5 |
| Lane7 | K28.5- | D21.5 | K28.5+ | D10.2 | ERR | ERR | K28.5- | K28.5+ | K28.5- | D21.5 | K28.5+ | D10.2 | ERR | ERR | K28.5- | K28.5+ | K28.5- | D21.5 |
| Lane8 | D | D | D | D | K28.5- | D21.5 | K28.5+ | D10.2 | ERR | ERR | K28.5- | K28.5+ | K28.7- | K28.7- | K28.7- | K28.7- | K28.5- | D21.5 |
| Lane9 | K28.5- | D21.5 | K28.5+ | D10.2 | ERR | ERR | K28.5- | K28.5+ | K28.5- | D21.5 | K28.5+ | D10.2 | ERR | ERR | K28.5- | K28.5+ | D | D |
| Lane10 | K28.5- | D21.5 | K28.5+ | D10.2 | ERR | ERR | K28.5- | K28.5+ | K28.5- | D21.5 | K28.5+ | D10.2 | ERR | ERR | K28.5- | K28.5+ | K28.5- | D21.5 |
| Lane11 | K28.5- | D21.5 | K28.5+ | D10.2 | ERR | ERR | K28.5- | K28.5+ | K28.5- | D21.5 | K28.5+ | D10.2 | ERR | ERR | K28.5- | K28.5+ | K28.5- | D21.5 |

Step 1: Receive truncated compliance pattern

A H Detected:(cfg_0_0)[0] PL_LTSSM_STATE [PCISIG]. [port_0] LTSSM state Polling.Active => Polling.Compliance

*lane 3 sees truncated compliance pattern: truncated COM during tail of COM.b5b5*
*lane 2 with 8 symbol tail sees com prepended to a4a4*

~ 47800 ps ~

|  | | Lane0 | Lane1 | Lane2 | Lane3 | Lane4 | Lane5 | Lane6 | Lane7 |
|---|---|---|---|---|---|---|---|---|---|
| A_H Debug: Cycle 1 | RX[0:7] | XX | XX | XX | COM | COM | XX | XX | COM ) |
| ~ 51800 ps ~ | | | | | | | | | |
| A_H Debug: Cycle 2 | RX[0:7] | COM | XX | XX | b5 | b5 | XX | XX | b5 ) |
| ~ 55800 ps ~ | | | | | | | | | |
| A_H Debug: Cycle 3 | RX[0:7] | COM | COM | XX | COM | COM | COM | COM | COM ) |
| ~ 59800 ps ~ | | | | | | | | | |
| A_H Debug: Cycle 4 | RX[0:7] | b5 | COM | XX | 4a | 4a | 4a | 4a | 4a ) |
| ~ 63800 ps ~ | | | | | | | | | |
| A_H Debug: Cycle 5 | RX[0:7] | COM | COM | XX | COM | COM | COM | COM | COM ) |
| ~ 67800 ps ~ | | | | | | | | | |
| A_H Debug: Cycle 6 | RX[0:7] | 4a | b5 | XX | b5 | b5 | b5 | b5 | b5 ) |
| ~ 71800 ps ~ | | | | | | | | | |
| A_H Debug: Cycle 7 | RX[0:7] | COM | COM | XX | COM | COM | COM | COM | COM ) |
| ~ 75800 ps ~ | | | | | | | | | |
| A_H Debug: Cycle 8 | RX[0:7] | 4a | 4a | XX | 4a | 4a | 4a | 4a | 4a ) |
| ~ 79800 ps ~ | | | | | | | | | |
| A_H Debug: Cycle 9 | RX[0:7] | COM | COM | COM | COM | COM | COM | COM | COM ) |

Step 2: Detecting Compliance Pattern as soon as it comes in with locking on COM.

~ 76 ns ~
A_H Debug: Non-Delayed compliance pattern seen on lane 3 and noOfSym in lanes are 8
A_H Debug: Non-Delayed compliance pattern seen on lane 4 and noOfSym in lanes are 8
A_H Debug: Non-Delayed compliance pattern seen on lane 7 and noOfSym in lanes are 8

FIG. 16

| | Lane0 | Lane1 | Lane2 | Lane3 | Lane4 | Lane5 | Lane6 | Lane7 |
|---|---|---|---|---|---|---|---|---|
| — 327800 ps — | | | | | | | | |
| A H Debug: Cycle 71 RX[0:7] { | COM | COM | COM | COM | COM | COM | COM | COM } |
| — 331800 ps — | | | | | | | | |
| A H Debug: Cycle 72 RX[0:7] { | COM | 4a | b5 | 4a | 4a | 4a | 4a | 4a ) |
| — 335800 ps — | | | | | | | | |
| A H Debug: Cycle 73 RX[0:7] { | COM | COM | COM | COM | COM | COM | COM | COM } |
| — 339800 ps — | | | | | | | | |
| A H Debug: Cycle 74 RX[0:7] { | b5 | COM | 4a | b5 | b5 | b5 | b5 | b5 ) |
| — 343800 ps — | | | | | | | | |
| A H Debug: Cycle 75 RX[0:7] { | COM | COM | COM | COM | COM | COM | COM | COM } |
| — 347800 ps — | | | | | | | | |
| A H Debug: Cycle 76 RX[0:7] { | 4a | b5 | b5 | 4a | 4a | 4a | 4a | 4a ) |
| — 351800 ps — | | | | | | | | |
| A H Debug: Cycle 77 RX[0:7] { | COM | COM | COM | COM | COM | COM | COM | COM } |
| — 355800 ps — | | | | | | | | |
| A H Debug: Cycle 78 RX[0:7] { | b5 | 4a | 4a | b5 | b5 | b5 | b5 | b5 ) |
| — 359800 ps — | | | | | | | | |
| A H Debug: Cycle 79 RX[0:7] { | COM | COM | COM | COM | COM | COM | COM | COM } |
| — 363800 ps — | | | | | | | | |
| A H Debug: Cycle 80 RX[0:7] { | 4a | COM | b5 | 4a | 4a | 4a | 4a | 4a ) |
| — 364 ns — | | | | | | | | |
| A H Debug: All lanes have seen delayed compliance pattern | | | | | | | | |
| A H Debug: Last lane with delayed compliance pattern is 1 | | | | | | | | |

A H Debug: Cycle 85  RX[0:7] { COM COM COM COM COM COM COM COM }
- 387800 ps -
A H Debug: Cycle 86  RX[0:7] { b5  b5  4a  b5  b5  b5  b5  b5 }
- 391800 ps -
A H Debug: Cycle 87  RX[0:7] { COM COM COM COM COM COM COM COM }
- 395800 ps -
A H Debug: Cycle 88  RX[0:7] { 4a  4a  COM 4a  4a  4a  4a  4a }
- 396 ns -
A H Debug: Calling function to align lanes on the basis of allowed skew

A H Debug: PL RX Lane[0] found compliance pattern
A H Debug: PL RX Lane[1] found compliance pattern
A H Error: Detected[cfg_0_0] (RX) || PL_SYNC_LN_SHIFT_COMPLIANCE [PCISIG] [port_0] RX Compliance pattern with delay symbols (COM) needs to appear on lane 0
M Derail Error: <testbench.iD>@64024515774.3 fs :: Detected[cfg_0_0] (RX) || PL_SYNC_LN_SHIFT_COMPLIANCE [PCISIG] [port_0] RX Compliance pattern with delay symbols (COM) needs to appear on lane 0

FIG. 19

SYSTEM AND METHOD FOR MONITORING COMPLIANCE PATTERNS

FIELD OF THE INVENTION

The present disclosure relates to a system and method for use in electronic communication systems.

BACKGROUND

In telecommunication or computing systems, a fast and flexible interconnect system is desirable to provide connectivity between devices for high levels of data throughput. In Peripheral Component Interconnect Express ("PCIe"), a compliance mode is used for the testing of the transmitter and interconnect to assess if it is voltage and timing compliant with the specification (See, PCI Express® Base Specification Revision 5.0 Version 1.0). The compliance mode is executed at a Polling Compliance state, which is used for testing the transmitter and interconnect. This is intended to be used in conjunction with test equipment (See, Section: 4.2.6.2.2 Polling.Compliance).

In operation, a compliance pattern is sent that allows for the measurement of inter symbol interference and cross-talk. This may include two modes of operation that require different patterns. These patterns may be different between various modes (e.g., 8b/10b mode, 128/130 mode, etc.).

SUMMARY

In one or more embodiments of the present disclosure, a method for monitoring compliance patterns is provided. The method may include receiving a truncated compliance pattern associated with a PCIe compliance mode and identifying a communication signal associated with the truncated compliance pattern. The method may further include discarding at least one unexpected symbol on at least one lane associated with the communication signal and collecting compliance patterns on all lanes of the communication signal. The method may also include aligning one or more lane FIFOs based upon skew and enabling one or more compliance pattern checkers.

One or more of the following features may be included. In some embodiments, aligning may include analyzing whether expected lanes receive a delayed compliance pattern. Aligning may include analyzing whether unexpected lanes do not receive a delayed compliance pattern. The method may further include discarding at least one compliance pattern if a delayed compliance pattern is not identified on each lane. Aligning may include analyzing whether a lane has a greater number of symbols than permitted by a maximum skew. The PCIe compliance mode may be a 8b10b mode. The truncated compliance pattern may be a modified compliance pattern and/or a normal compliance pattern. The truncated compliance pattern may be received from a re-timer device-under-test at a BFM monitor. Enabling checkers may include verifying accuracy of compliance patterns, frequency of delayed compliance patterns, and disparity of compliance pattern symbols.

In one or more embodiments of the present disclosure, a system for monitoring compliance patterns is provided. Embodiments may include a re-timer device-under-test configured to transmit a truncated compliance pattern associated with a PCIe compliance mode. Embodiments may further include a BFM monitor configured to receive the truncated compliance pattern and to identify a communication signal associated with the truncated compliance pattern. The BFM monitor may be further configured to discard at least one unexpected symbol on at least one lane associated with the communication signal and to collect compliance patterns on all lanes of the communication signal. The BFM monitor may be further configured to align one or more lane FIFOs based upon skew and to enable one or more compliance pattern checkers.

One or more of the following features may be included. In some embodiments, aligning may include analyzing whether expected lanes receive a delayed compliance pattern. Aligning may further include analyzing whether unexpected lanes do not receive a delayed compliance pattern. The BFM monitor may be further configured to discard at least one compliance pattern if a delayed compliance pattern is not identified on each lane. Aligning may include analyzing whether a lane has a greater number of symbols than permitted by a maximum skew. The PCIe compliance mode may be an 8b10b mode. The truncated compliance pattern may be a modified compliance pattern and/or a normal compliance pattern. Enabling checkers may include verifying accuracy of compliance patterns. Enabling checkers may include verifying frequency of delayed compliance patterns and disparity of compliance pattern symbols.

Additional features and advantages of embodiments of the present disclosure will be set forth in the description which follows, and in part will be apparent from the description, or may be learned by practice of embodiments of the present disclosure. The objectives and other advantages of the embodiments of the present disclosure may be realized and attained by the structure particularly pointed out in the written description and claims hereof as well as the appended drawings.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the present disclosure and are incorporated in and constitute a part of this specification, illustrate embodiments of the present disclosure and together with the description serve to explain the principles of embodiments of the present disclosure.

FIG. 7A-7B show tables depicting an example of a normal compliance pattern for 8b/10b.

FIG. 8 shows an example of a multi-lane normal compliance pattern for 8b/10b.

FIG. 9A-9B show tables depicting an example of a modified compliance pattern for 8b/10b.

FIG. 10 shows a diagram depicting a multi-lane normal compliance pattern for 8b/10b.

FIG. 14 is a diagram showing a multi-lane normal compliance pattern according to an embodiment of the present disclosure;

FIGS. 16-19 show example compliance patterns according to an embodiment of the present disclosure.

DETAILED DESCRIPTION

Figure 1:
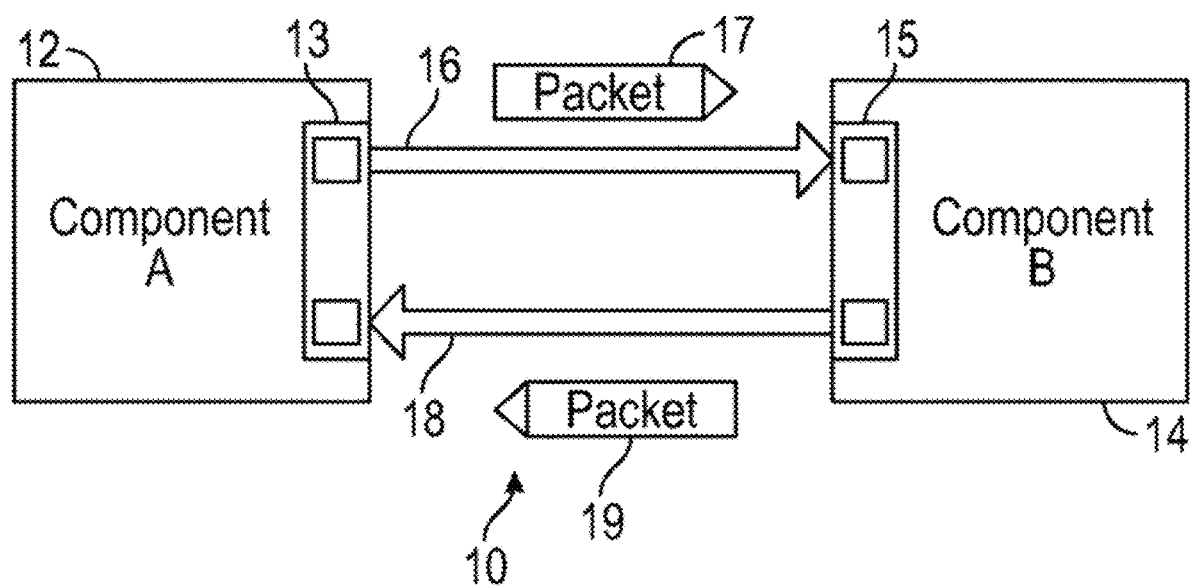
FIG. 1 illustrates an example communications channel.

Embodiments of the present disclosure are directed towards a customized mechanism to monitor PCIe skewed truncated compliance patterns at a 8b10b mode. The process described herein enhances the capability and robustness to lock on to truncated compliance patterns in PCIe 8b10b mode. Embodiments included herein may extend from the modified compliance pattern of PCIe to the normal compliance pattern and may operate effectively beyond the mandated skews. Therefore, it provides improved monitoring and error reporting for verification excellence.

Reference will now be made in detail to the embodiments of the present disclosure, examples of which are illustrated in the accompanying drawings. The present disclosure may, however, be embodied in many different forms and should not be construed as being limited to the embodiments set forth herein; rather, these embodiments are provided so that this disclosure will be thorough and complete, and will fully convey the concept of the present disclosure to those skilled in the art. In the drawings, the thicknesses of layers and regions may be exaggerated for clarity. Like reference numerals in the drawings may denote like elements.

It will be understood that "layer," "layers," or variations thereof as mentioned herein refers to the layers of abstraction of the conceptual models that may be used to describe telecommunication or computing devices. An example of a conceptual model that uses layers of abstraction includes the Open Systems Interconnection model (OSI model) for network protocols or PCI (Peripheral Component Interconnect) Express, referred to as PCIe, for connecting components in computers. It will also be understood that actions, such as transmitting a request, receiving a response, scheduling packets, etc., being performed by the different layers disclosed herein are performed by the hardware/software that constitutes the corresponding layer.

For the sake of explanation, embodiments are described with reference to systems that utilize the PCI Express architecture for communication. PCIe is a general-purpose architecture defined for interconnecting I/O subsystems to processors. The PCIe architecture uses packet-based communication over high-speed serial links to provide a scalable I/O interconnect architecture for systems ranging from laptop computers to supercomputers. However, embodiments disclosed herein are not limited to the PCIe standard and are equally applicable to all communication standards/protocols that include a multi-layered architecture (e.g., OSI model), without departing from the scope of the disclosure.

FIG. 1 illustrates a point-to-point communications channel. Solely for the sake of explaining scheduling of packets according to example embodiments disclosed herein, the point-to-point communications channel is considered as being implemented based on the PCIe architecture. As shown in FIG. 1, two modules 12 and 14, each including a respective transmit and receive port pair 13 and 15, communicate with each other via a communication link 10. The communication link 10 includes two channels 16 and 18, one in each direction. PCI-Express uses packets to communicate information between modules. The channels 16 and 18 each carry packets 17 and 19 between the components.

Figure 2:
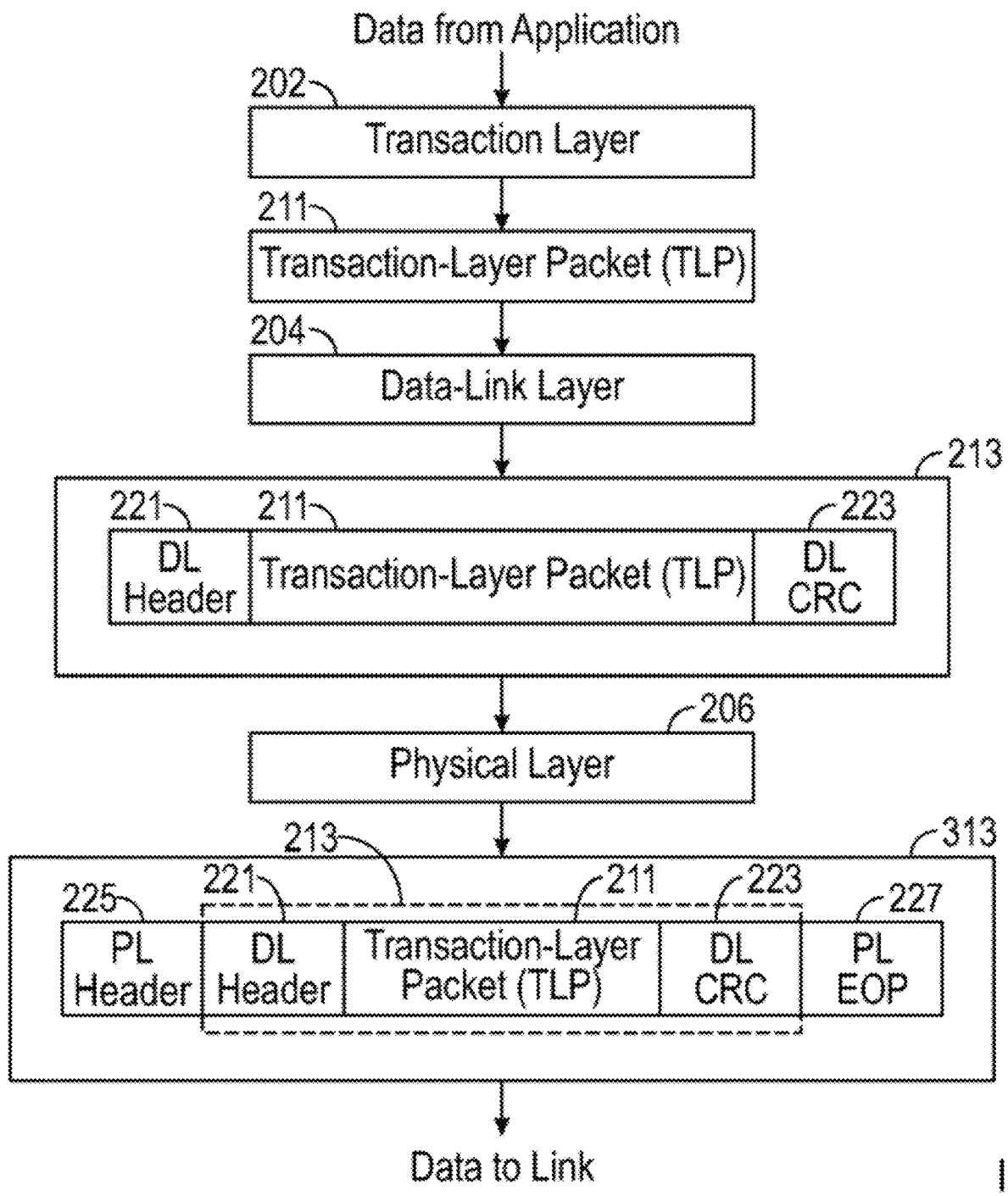
FIG. 2 is a schematic overview of a PCI Express (Peripheral Component Interconnect Express) architecture.

FIG. 2 is a schematic overview of a PCIe architecture. As illustrated, the PCIe architecture is based on a three-layer protocol stack that includes a physical layer 206, a data link layer 204, and a transaction layer 202 (illustrated in increasing order of abstraction). The physical layer 206 defines the technology and electrical specifications of the physical medium, transmission coding, channel bonding mechanisms, methods for striping higher-layer packets across multiple serial links. The data link layer 204 defines the protocols for reliable communication across the link. The transaction layer 202 uses the link provided by the data link layer to support memory and I/O transactions (reads and writes) across the link. Applications use services provided by the transaction layer 202 to access the memory or I/O resources in a remote device.

Packets are formed in the transaction layer 202 and the data link layer 204 to carry the information from the transmitting component to the receiving component. Each layer adds its own header/trailer (or other information) to the incoming packet transmitted by the previous layer and outputs a new packet including the incoming packet and the header/trailer (a process referred to as data encapsulation). For example, as illustrated in FIG. 2, transaction layer 202 transmits a data packet, indicated as transaction layer packet 211, to the data link layer 204. The data link layer 204 adds a header, e.g., illustrated as DL header 221, and a trailer, e.g., illustrated as DL CRC 223, to the transaction layer packet 211, and generates a new data packet including the transaction layer packet 211, the DL header 221, and the DL CRC 223. The new data packet, referred to as data link layer (DLL) data packet 213 (referred to herein as DLL-DP), is output to the physical layer 206. The physical layer 206 adds another header PL header 225 and trailer PL end of packet (EOP) 227 to the incoming DLL-DP 213, and generates a new data packet including the DLL-DP 213, the PL header 225, and PL EOP 227. The new data packet, referred to as physical layer (PL) data packet 313 (referred to herein as PL-DP), is output to one or more links for transmission, e.g., to other modules in the system.

Figure 3:
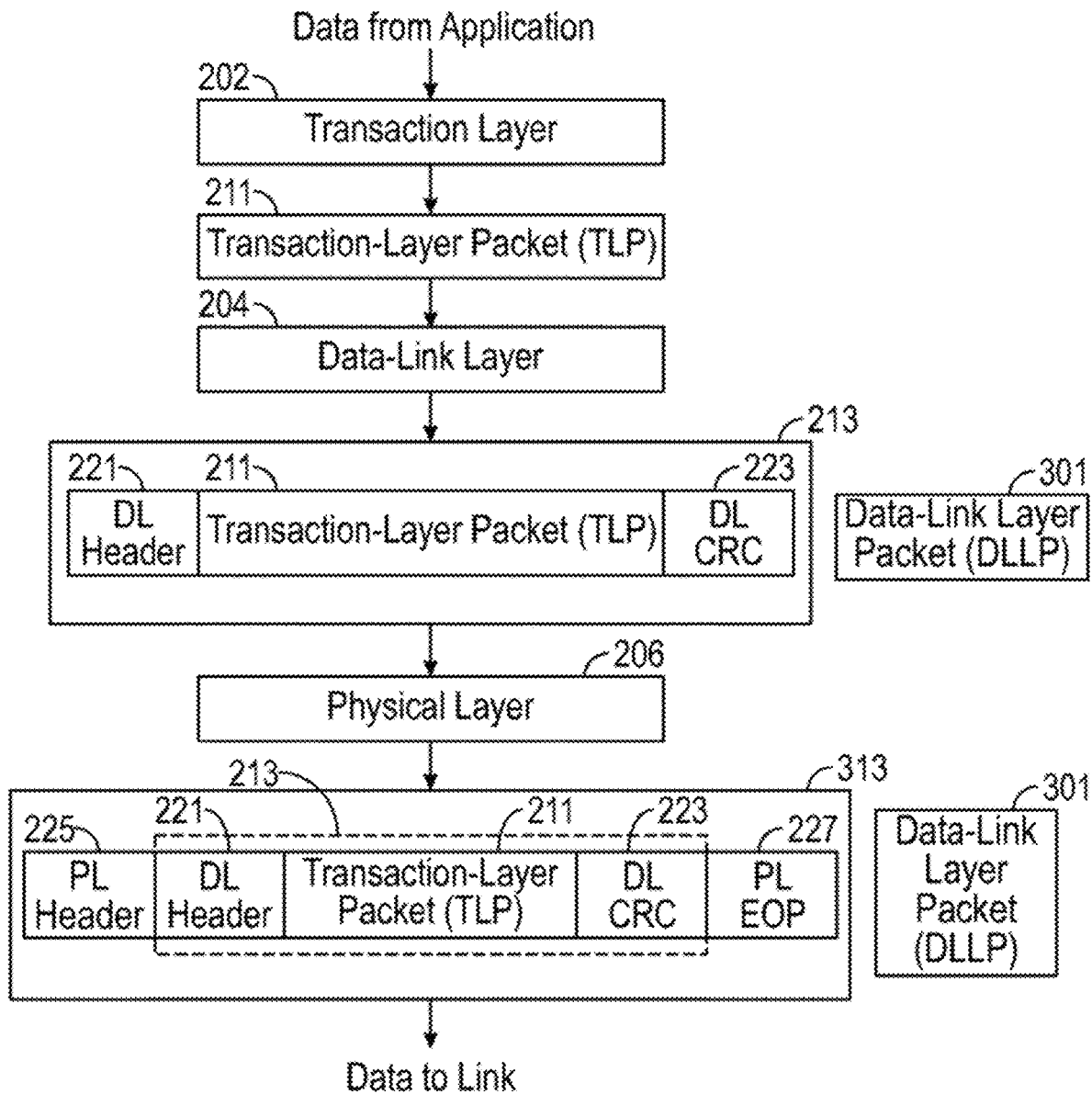
FIG. 3 shows a schematic representation of packet flow through the layers shown in FIG. 2.

In addition to application data, the PCIe links also carry one or more control packets used to communicate control information such as data-link layer acknowledgements, flow control information, link power management information, and the like. FIG. 3 shows a schematic representation of packet flow through the different layers shown in FIG. 2. As illustrated, the data link layer 204 multiplexes a control packet, indicated as data link layer packet (DLLP) 301, with the transaction layer packet 211. The data link layer packet (DLLP) 301 are generated by the data link layer 204 and output along with DLL-DP 213 in the outgoing data stream.

When the data link layer 204 schedules a data link layer packet (DLLP) 301 on its outgoing data stream, the data link layer 204 shifts and re-aligns the DLL-DP 213 and inserts one or more data link layer packets 301 at specific locations in the data stream, and applies backpressure to delay the incoming transaction layer packets 211. In applying backpressure, the data link layer 204 requests the transaction layer 202 (or more specifically, to the logic included in the transaction layer 202) to delay transmission of transaction layer packets 211. In an example, the delay may include a predetermined number of clock cycles.

Figure 4:
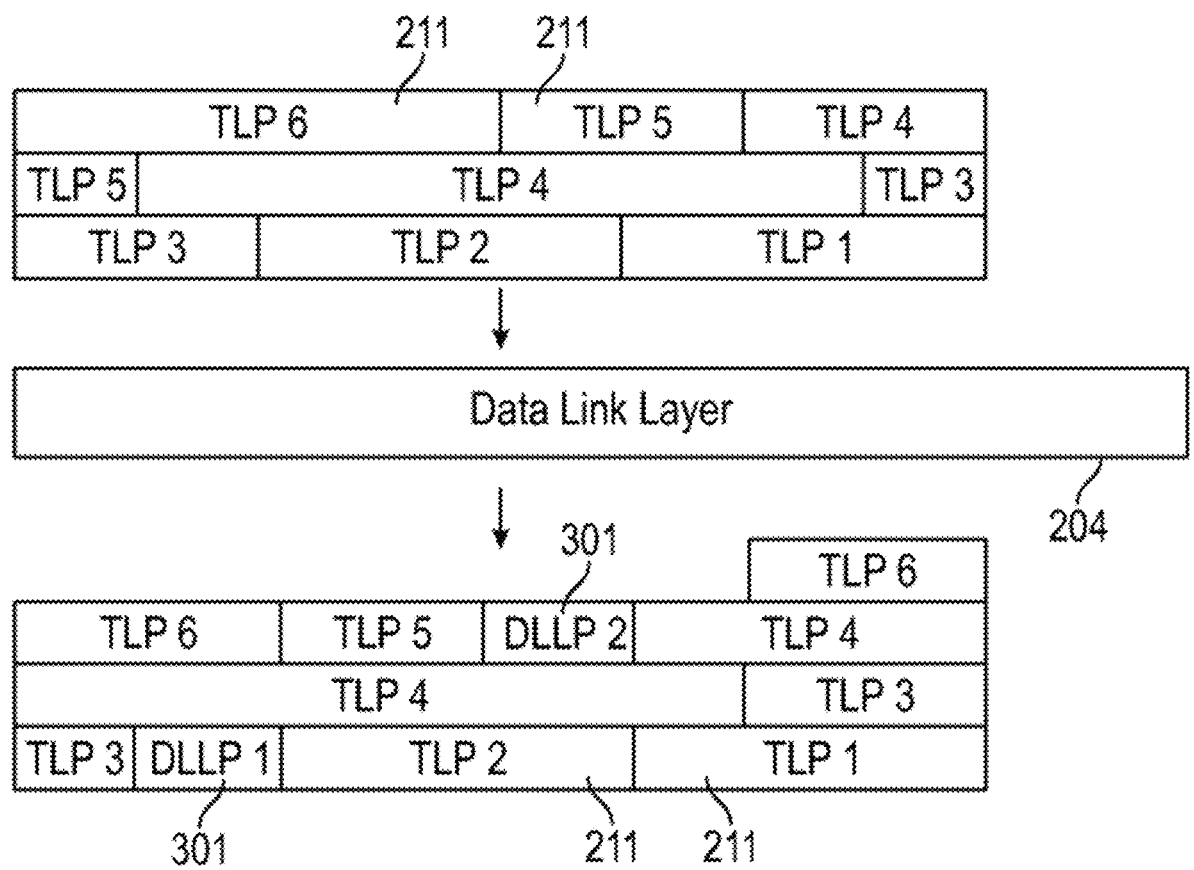
FIG. 4 illustrates packet flow through the data link layer in FIG. 2.

FIG. 4 illustrates packet flow through the data link layer 204. For the sake of clarity of illustration, the DL header 221 and DL CRC 223 are omitted in FIG. 4. Also for the sake of clarity of illustration, only the transaction layer packet 211 portion of the data link layer (DLL) data packet 213 is illustrated. However, it will be understood that the outgoing data stream from the data link layer 204 includes data link layer (DLL) data packets 213 corresponding to the transaction layer packets 211 (TLP1-TLP6) in the input data stream.

The data link layer 204 receives transaction layer packets 211 (indicated as TLP1-TLP6) in the input data stream. The data link layer 204 shifts and re-aligns the transaction layer packets 211 (TLP1-TLP6) to insert the data link layer packets 301 (DLLP1 and DLLP2) at specific locations between the transaction layer packets 211 (TLP1-TLP6). As illustrated, in the outgoing data stream, the data link layer packet DLLP1 is inserted between transaction layer packets TLP2 and TLP3, and the data link layer packet DLLP2 is inserted between transaction layer packets TLP4 and TLP5.

Figure 5:
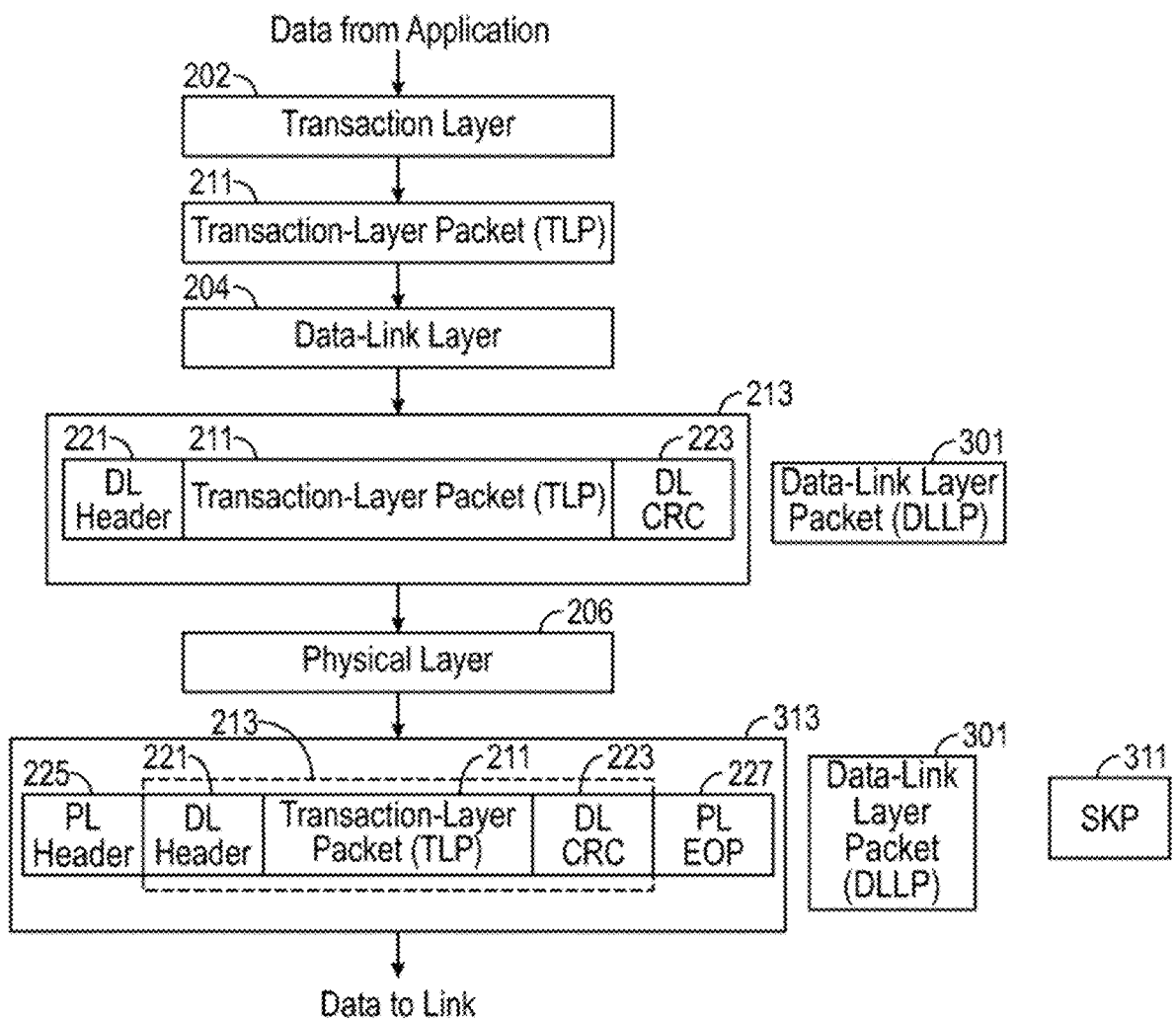
FIG. 5 shows another schematic representation of packet flow through the layers shown in FIG. 2.

In addition to including the header PL header 225 and the trailer PL EOP 227, the physical layer 206 also inserts additional control packets to the outgoing data stream. FIG. 5 shows another schematic representation of packet flow through the layers shown in FIG. 2. The physical layer 206 receives the data stream from the data link layer 204 and generates a control packet and inserts the control packet in the outgoing data stream. The control packet is inserted periodically or at defined intervals in the outgoing data stream. In an embodiment, the control packet is a SKP sequence 311. The SKP sequence 311 is used to minimize data loss when the receiver clock is different from the transmitter clock, and to facilitate alignment of data transmitted between the modules.

When the physical layer 206 schedules a SKP sequence 311 on its outgoing data stream, it applies backpressure to delay the incoming data link layer (DLL) data packets 213 and data link layer packets 301 in order to create space for the SKP sequence 311. In applying backpressure, the physical layer 206 requests to the transaction layer 202 and/or to the data link layer 204 to delay transmission of the transaction layer packets 211, the data link layer (DLL) data packets 213, and/or data link layer packets 301. In an example, the delay may include one or more clock cycles. In addition to applying backpressure, the physical layer 206 shifts and re-aligns the packets received from the data link layer 204 and inserts one (or more) SKP sequence 311 at specific location in the data stream.

Figure 6:
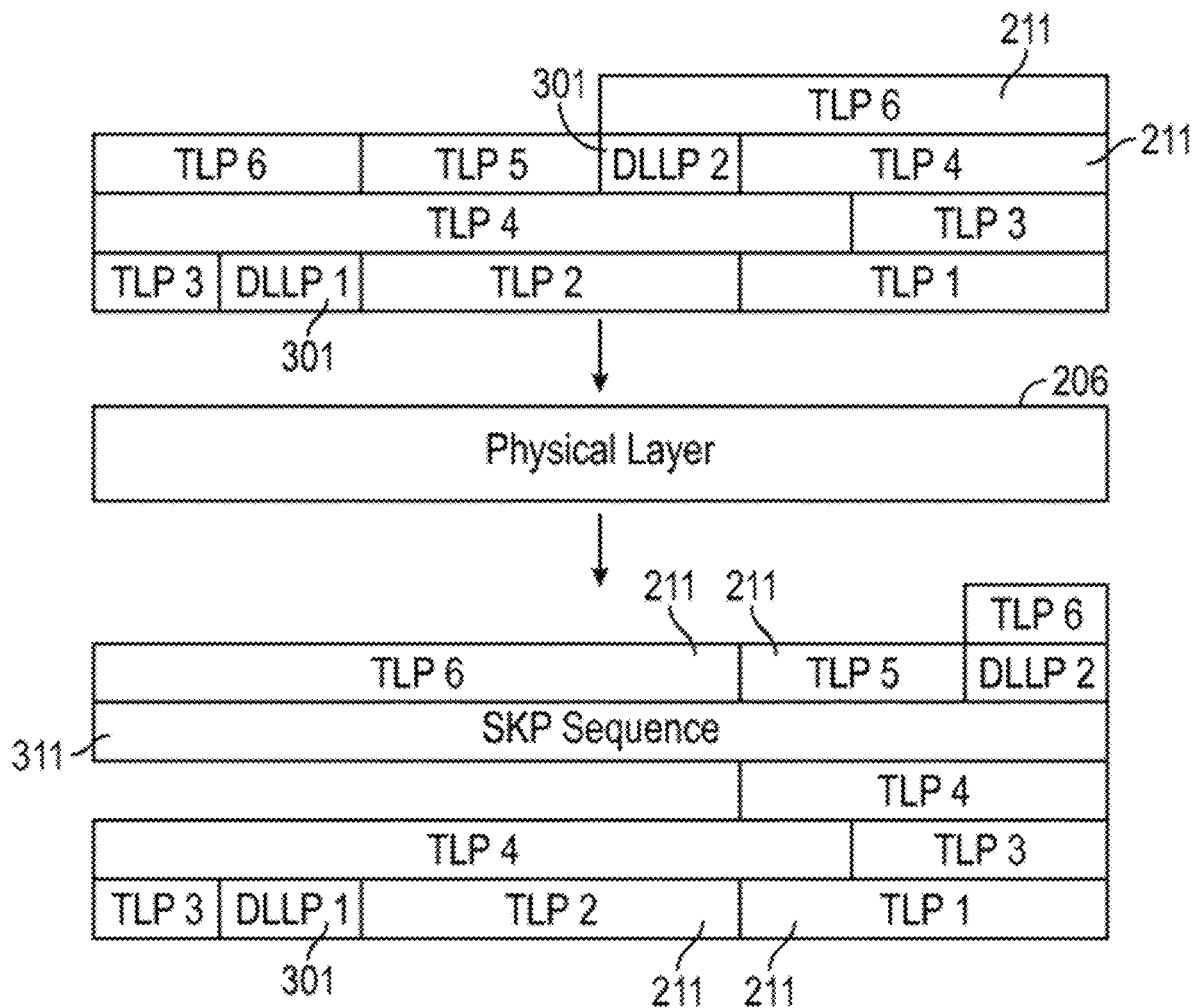
FIG. 6 illustrates packet flow through the physical layer in FIG. 2.

FIG. 6 illustrates packet flow through the physical layer 206. For the sake of clarity of illustration, the DL header 221, PL header 225, DL CRC 223, and PL EOP 227 are omitted in FIG. 6. Also for the sake of clarity of illustration, only the transaction layer packet 211 portion of the physical layer (PL) data packet 313 is illustrated. However, it will be understood that the outgoing data stream from the physical layer 206 includes physical layer (PL) data packet 313 corresponding to the data link layer (DLL) data packets 213 received from the data link layer 204.

The physical layer 206 receives from the data link layer 204 a data stream including transaction layer packets 211 (TLP1-TLP6) and data link layer packets 301 (DLLP1 and DLLP2). The physical layer 206 shifts and re-aligns the transaction layer packets 211 (TLP1-TLP6) and the data link layer packets 301 (DLLP1 and DLLP2) received from the data link layer 204 to insert the SKP sequence 311 at a specific location in the outgoing data stream. As illustrated, in the outgoing data stream, the SKP sequence 311 is inserted between the transaction layer packet TLP4 and the data link layer packet DLLP2.

As discussed above, in PCIe, a compliance mode is used for the testing of the transmitter and interconnect to assess if it is voltage and timing compliant with the specification (See, PCI Express® Base Specification Revision 5.0 Version 1.0). The compliance mode is executed at a Polling Compliance state, which is used for testing the transmitter and interconnect. (See, Section: 4.2.6.2.2 Polling.Compliance). This is intended to be used in conjunction with test equipment as is discussed in further detail hereinbelow.

In operation, a compliance pattern is sent that allows for the measurement of inter symbol interference and cross-talk. This may include two modes of operation that require different patterns. The first is a normal mode, which may be used with a compliance load board ("CLB") or compliance base board ("CBB") and oscilloscope. In a modified mode, simplified inter-operability testing may be used with testing and measurement equipment such as a pattern generator, bit error rate testers ("BERT"), oscilloscope, etc. In some cases, a re-timer device-under-test ("DUT") may send a skewed truncated pattern. These patterns may be different between various modes (e.g., a 8b/10b mode and 128/130 mode).

PCIe has six generations and the speed of communication has increased with each subsequent release. For example, Gen1: 2.5 Gb/s, Gen2: 5 Gb/s, Gen3: 8 Gb/s, Gen4: 16 Gb/s, Gen5: 32 Gb/s, Gen6: 64 Gb/s. As used herein, the phrase "block mode" may refer to Gen3 and subsequent versions. "Block Mode" (e.g., also referred to as 128b/130b, which may refer to the mode a PCIe device is in when running at speeds Gen3 and upwards) and "non-block mode" (e.g., also referred to as 8b/10b, which may refer to the mode a PCIe device is in when running at Gen1 and Gen2 speeds) may each include modified and normal compliance patterns comprising specific symbols.

Embodiments included herein focus on normal and modified compliance patterns for the non-block mode. In some embodiments, a normal compliance pattern is different for the block mode and the non-block mode. Similarly, the modified compliance pattern is also different for the block mode and the non-block mode. Additionally and/or alternatively, the sequence of symbols differs for normal and modified compliance patterns. Embodiments included herein may utilize a "truncated" compliance pattern, which may refer to one or more normal and/or modified compliance patterns that are missing one or more symbols in the beginning. This is discussed in further detail hereinbelow.

Referring now to FIG. 7A, a table 700 showing an example of a normal compliance pattern for 8b/10b is provided. Table 700 includes symbol, current disparity, pattern, and symbol information. For a multilane device, every eighth lane delays the pattern. In this particular example, the delay symbol D is K28.5 (COM) as is shown in FIG. 7B. It should be noted that although the normal compliance pattern may include 4 symbols, in some embodiments 8 symbols (e.g. 2×) may be used as the delayed version may require 8 symbols. An example diagram 800 showing a multi-lane normal compliance pattern for 8b/10b is shown in FIG. 8.

Referring now to FIG. 9A, a table 900 showing an example of a modified compliance pattern for 8b/10b is provided. Table 900 includes symbol, current disparity, pattern, and byte information. In this example, the same delay principle may apply, however, it may be achieved with 4 delay symbols and padded at the end with K28.7—(EIE "0011111000"). Although the modified compliance pattern is 8 symbols, in some embodiments 16 symbols (2×) may be used internally as the delayed version may require 16 symbols. An example diagram 1000 showing a multi-lane normal compliance pattern for 8b/10b is shown in FIG. 10.

Figure 11:
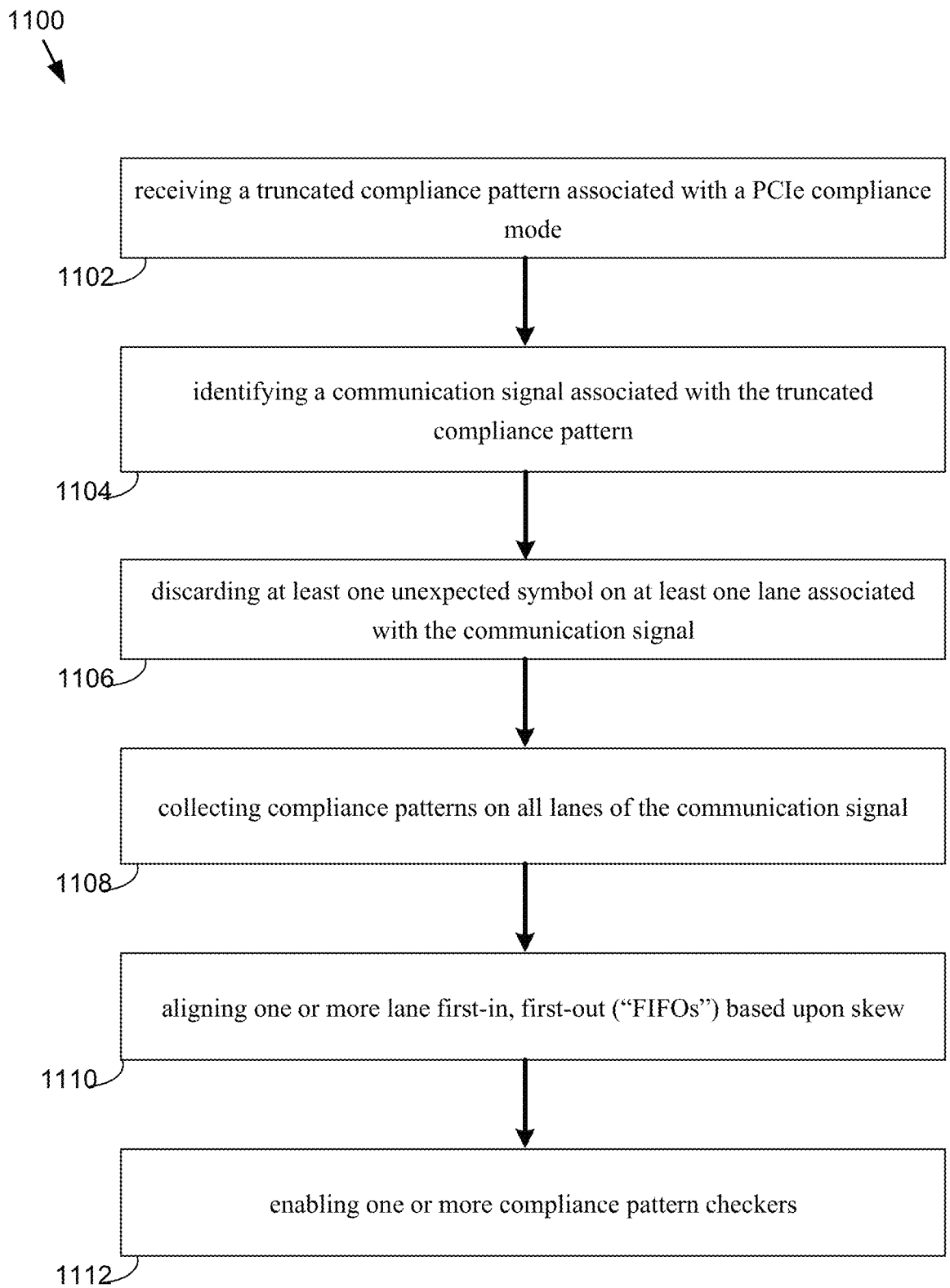
FIG. 11 is an exemplary flowchart according to an embodiment of the present disclosure.

Referring now to FIG. 11, a flowchart 1100 depicting an embodiment consistent with the present disclosure is provided. Embodiments may provide a customized mechanism to monitor one or more PCIe skewed truncated compliance patterns at a 8b10b mode. The method may include receiving (1102) a truncated compliance pattern associated with a PCIe compliance mode and identifying (1104) a communication signal associated with the truncated compliance pattern. The method may further include discarding (1106) at least one unexpected symbol on at least one lane associated with the communication signal and collecting (1108) compliance patterns on all lanes of the communication signal. The method may also include aligning (1110) one or more lane FIFOs based upon skew and enabling (1112) one or more compliance pattern checkers. Numerous other operations are also within the scope of the present disclosure.

Figure 12:
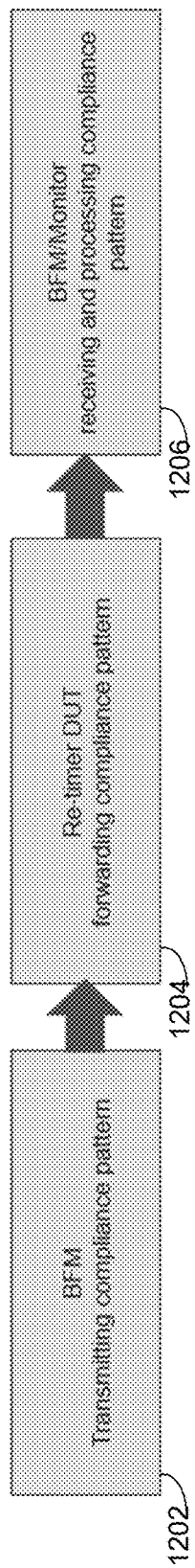
FIGS. 12-13 show diagrams of systems according to embodiments of the present disclosure.

Referring now to FIG. 12, a diagram 1200 showing an example system that may be used to implement aspects of the present disclosure is provided. The system may include a bus functional module ("BFM") 1202, which may be configured to transmit one or more compliance patterns. BFM 1202 may include verification IP and may be configured to send and receive patterns or collections of symbols. Re-timer DUT 1204 may be configured to receive the compliance patterns and may forward along to the BFM/Monitor 1206, which may include a module monitoring DUT behavior based on inputs received from verification intellectual property ("VIP"). In some embodiments, re-timer DUT 1204 may be a customer component that is being tested.

In operation, a compliance pattern may be sent that allows for the measurement of inter symbol interference and crosstalk. This may include two modes of operation that require different patterns. The first is a normal mode, which may be used with the CLB, CBB, and/or oscilloscope. In a modified mode, simplified inter-operability testing may be used with testing and measurement equipment such as a pattern generator, BERT, oscilloscope, etc. In some cases, a re-timer DUT may send a skewed truncated pattern. These patterns may be different between a 8b/10b mode and 128/130 mode.

Figure 13:
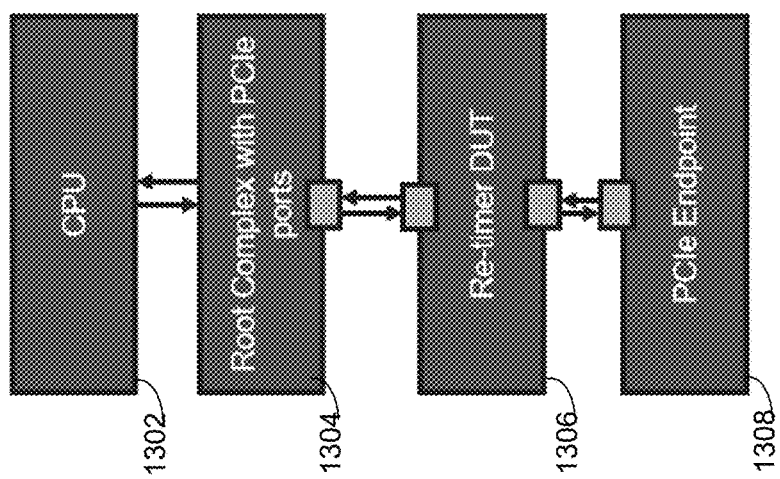

Referring now to FIG. 13, a diagram 1300 showing an example system that may be used to implement aspects of present disclosure is provided. The system may include a CPU 1302, root complex with PCIe ports 1304, re-timer DUT 1306, and PCIe Endpoint 1308. In some cases, the root complex and endpoint in the real system may be replaced by the BFM VIP in the test environment.

In some embodiments, and as discussed above, the process of present disclosure may be configured to operate in the 8b/10b mode. It should be noted that a truncated compliance pattern is not an issue for the block mode since it consists of Electrical Idle Exit Ordered Sets ("EIEOS") and not repeated COM symbols. Accordingly, the VIP associated with the present disclosure may be configured to receive locks on EIEOS and may be configured to lock on following EIEOS if the prior ones are truncated.

For a compliance pattern in an 8b/10b mode, the standard specification allows the receiver to drop the truncated compliance patterns for a normal compliance pattern (as the specification only mandates locking on a truncated modified compliance pattern for error reporting).

Embodiments of the present disclosure, in addition to simply discarding erroneous symbols, may accurately recognize skewed truncated compliance patterns to form complete packets to reflect what exactly the re-timer DUT transmitted. Embodiments included herein may also enable checkers, which greatly improves this re-timer specific verification area.

Embodiments of the present disclosure may be configured to support the skewed truncated pattern beyond specification tolerated skews starting anywhere within the original compliance pattern, any time within skew limits, and on any lane. Additionally and/or alternatively, embodiments of the present disclosure may be configured to extend to a normal compliance pattern therefore supporting both normal and modified compliance patterns in 8b/10b mode, which is a vast improvement over existing approaches.

In some embodiments, the present disclosure may be configured to lock on to a truncated normal compliance pattern for error checking, which is another improvement over existing techniques.

Figure 14:
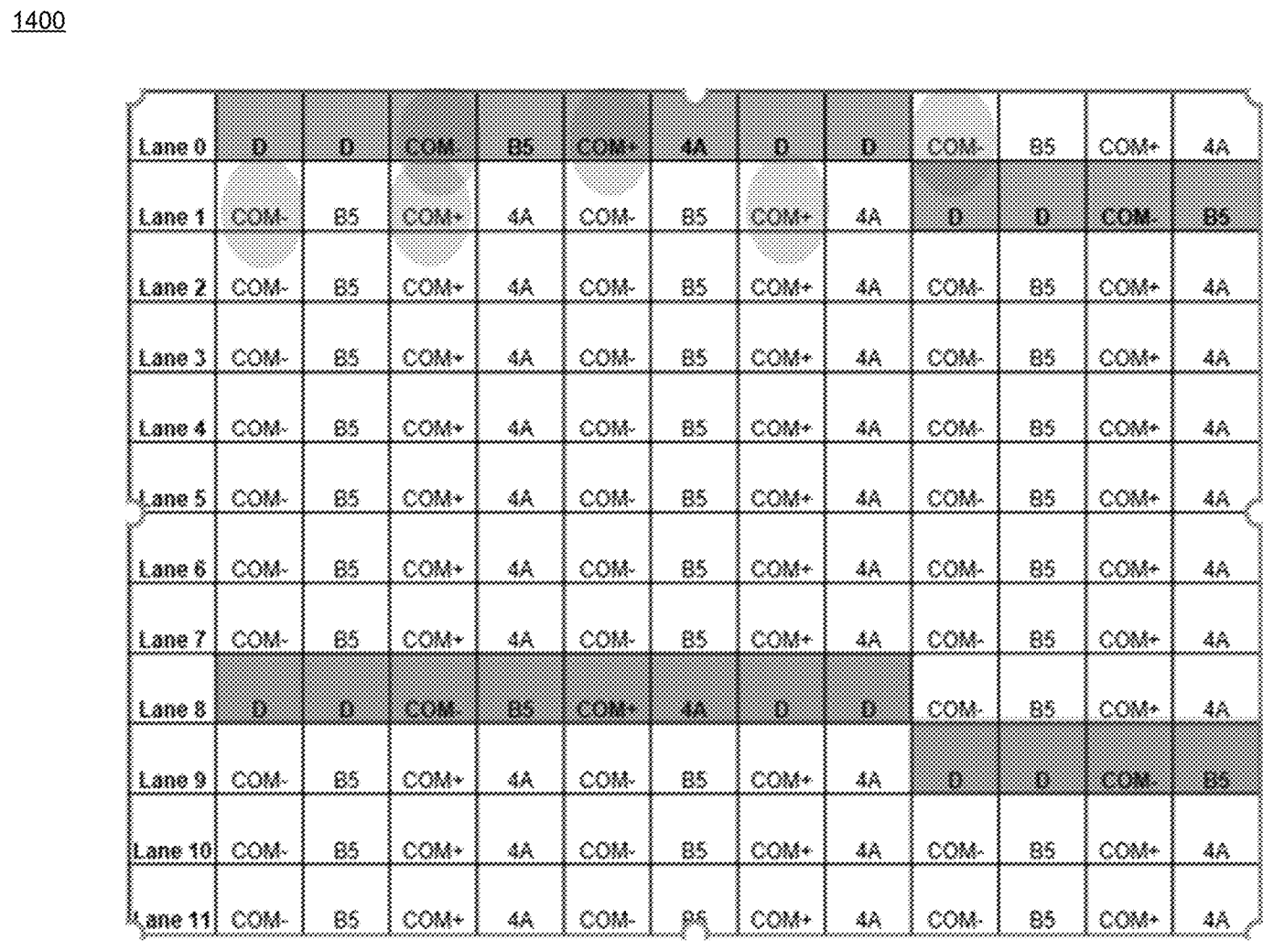

Referring now to FIG. 14, a table 1400 showing a multi-lane normal compliance pattern is provided. This figure illustrates some of the issues with compliance patterns. A compliance pattern may include symbols repeating itself (COM) within the pattern making it hard to identify its beginning, middle or end. It should be noted that the term "COM" may refer to a symbol that may be present in compliance patterns (e.g., normal and modified).

In some embodiments, a COM symbol in PCIe may denote the beginning of ordered sets and may be used for locking purposes in non-block mode. This particular example may provide a number of challenges for the re-timer. For example, the re-timer may take time to lock on the received compliance pattern and may start forwarding the compliance pattern in the middle of a compliance pattern, on different times and/or on different lanes. To add to the complexity, the two varieties of compliance patterns in non-block mode (e.g., normal and modified compliance patterns) may include multiple COM's. Add to this the varying skews used by the re-timer for Gen 1 and Gen2. The VIP may also face a number of challenges. For example, in operation, the VIP may lock on the middle of the compliance pattern giving an impression that a compliance pattern is identified, which may lead to errors later in the course of the simulation. Locking on to the accurate compliance pattern and adjusting the skew before enabling the checkers is a challenging issue. It should be noted that compliance patterns (both normal and modified) are unique in that there is a delayed compliance pattern on every 8th lane in a multi-lane configuration which is unique even under truncation. This may be used to confirm accurate locking of the compliance pattern.

In some embodiments, the process of the present disclosure may be configured to lock on to the COM for normal and modified compliance patterns. Monitoring process 10 may then adjust skew and enable checkers for verifying accuracy of compliance patterns, frequency of delayed compliance patterns and disparity of compliance pattern symbols.

Accordingly, embodiments of the present disclosure may provide support for more than the specification supported skew as it extends for both normal and modified truncated compliance patterns. For example, the standard skew as mandated by the PCIe specification is 5 symbols for GEN1 and 4 symbols for GEN2. In contrast, the innovative skew associated with the present disclosure may include 8 symbols for both GEN1 and GEN2. Locking and decoding on truncated normal compliance patterns is unique to the present disclosure and it allows for the verification of truncated patterns received from the re-timer DUT.

Figure 15:
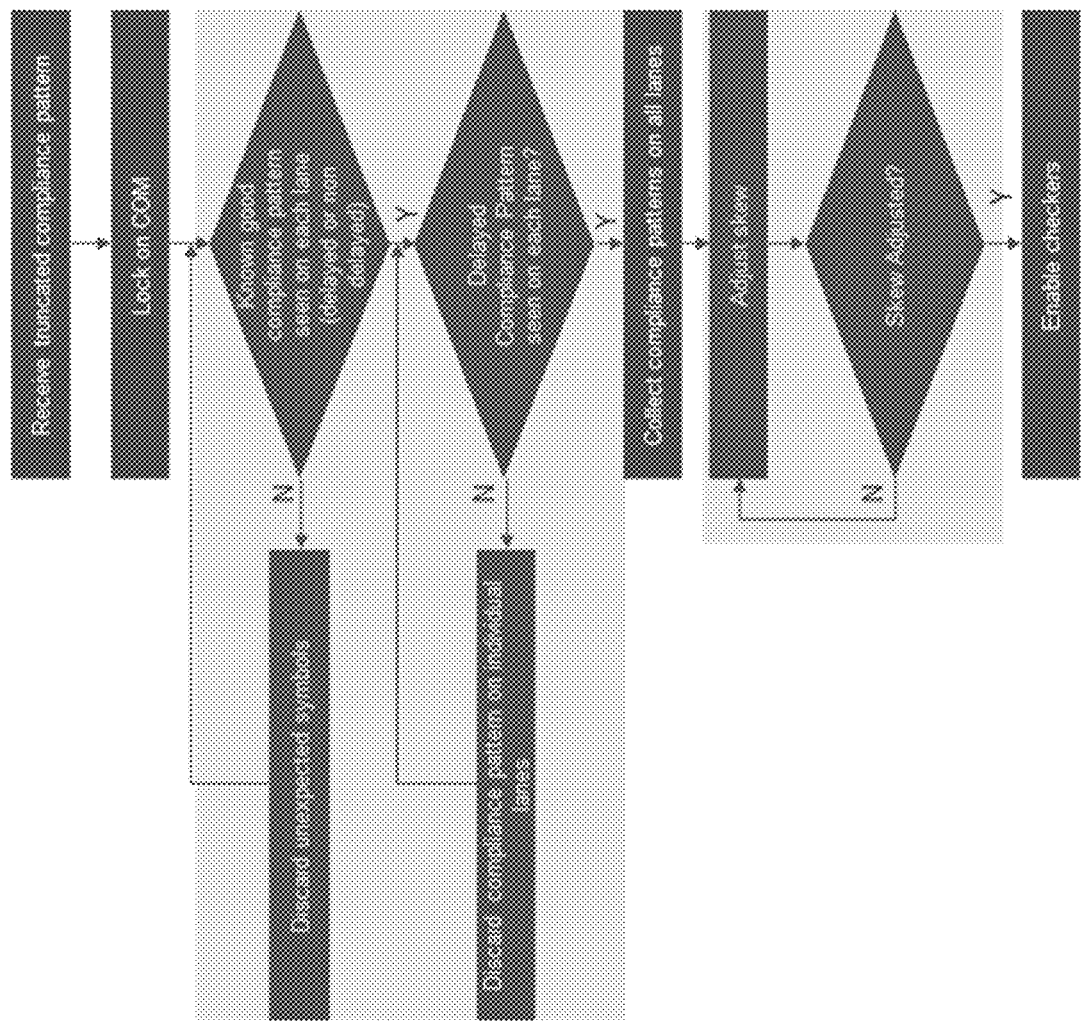
FIG. 15 is an exemplary flowchart of a monitoring process according to an embodiment of the present disclosure.

Referring now to FIG. 15, a flowchart 500 showing operations consistent with embodiments of the present disclosure is provided. As shown in the figure, embodiments included herein may be configured to lock on the COM for one or more truncated compliance patterns. Once locked, embodiments included herein may then discard any unexpected symbols on each lane until a good compliance pattern is identified on each lane. The process may continue discarding known good compliance patterns on each lane until one or more delayed compliance patterns are identified on each lane. Once delayed compliance patterns are identified on all lanes, embodiments included herein may allow compliance patterns to be collected on all lanes together.

In some embodiments, the present disclosure may be configured to align the lane FIFOs on the basis of skew. Embodiments included herein may be configured to verify that lanes are aligned by analyzing whether expected lanes receive delayed compliance patterns and whether unexpected lanes do not.

In some embodiments, the process of the present disclosure may be configured to enable compliance pattern checkers which may verify the re-timer DUT behavior. For example, a delayed compliance pattern seen on every 8th lane, incorrect compliance patterns not seen, and disparity is maintained on compliance pattern symbols.

Referring now to FIGS. 16-19, an example showing operations consistent with embodiments of the present disclosure is provided. FIGS. 16-19 show an example for locking on a COM for truncated compliance patterns associated with normal compliance patterns.

In some embodiments, the first step may include receiving a truncated compliance pattern as shown in FIG. 16 and then detecting the compliance pattern by locking on the COM. In the first step, only a few lanes receive complete normal compliance patterns without skew (e.g., lanes 3, 4 and 7). One lane receives a truncated normal compliance pattern (e.g., Lane 1) and one lane receives a complete normal compliance pattern with 8 symbol skew (e.g., Lane 2 with 8 symbol skew as compared to Lane 3). Accordingly, step 1 illustrates that different lanes receive a mix of patterns including complete normal compliance patterns, truncated normal compliance patterns and/or skewed normal compliance patterns. Step 2 of FIG. 16 illustrates that embodiments included herein may be configured to lock on a COM symbol for all complete normal compliance patterns, truncated normal compliance pattern and/or skewed normal compliance patterns. The process may then discard unexpected and known good compliance patterns on individual lanes until all lanes have seen a delayed compliance pattern as shown in FIG. 17. This figure also illustrates that the process may wait for all lanes to receive delayed normal compliance patterns.

FIG. 18 shows an example calling function to adjust skew after collecting compliance patterns on all lanes. In some embodiments, skew may be based upon whether or not expected lanes do not have delayed compliance patterns, when unexpected lanes have delayed compliance patterns, and/or when lanes have a greater number of symbols than permitted by maximum skew. In this way, the process may be configured to align all the lanes on the basis of skew settings (e.g., from the customer) once all the lanes have received delayed normal compliance patterns.

FIG. 19 shows an example for enabling checkers where the sample error is shown below post enabling checkers. This is an example error report that may be provided as part of checking normal compliance patterns received by the BFM VIP.

Figure 20:
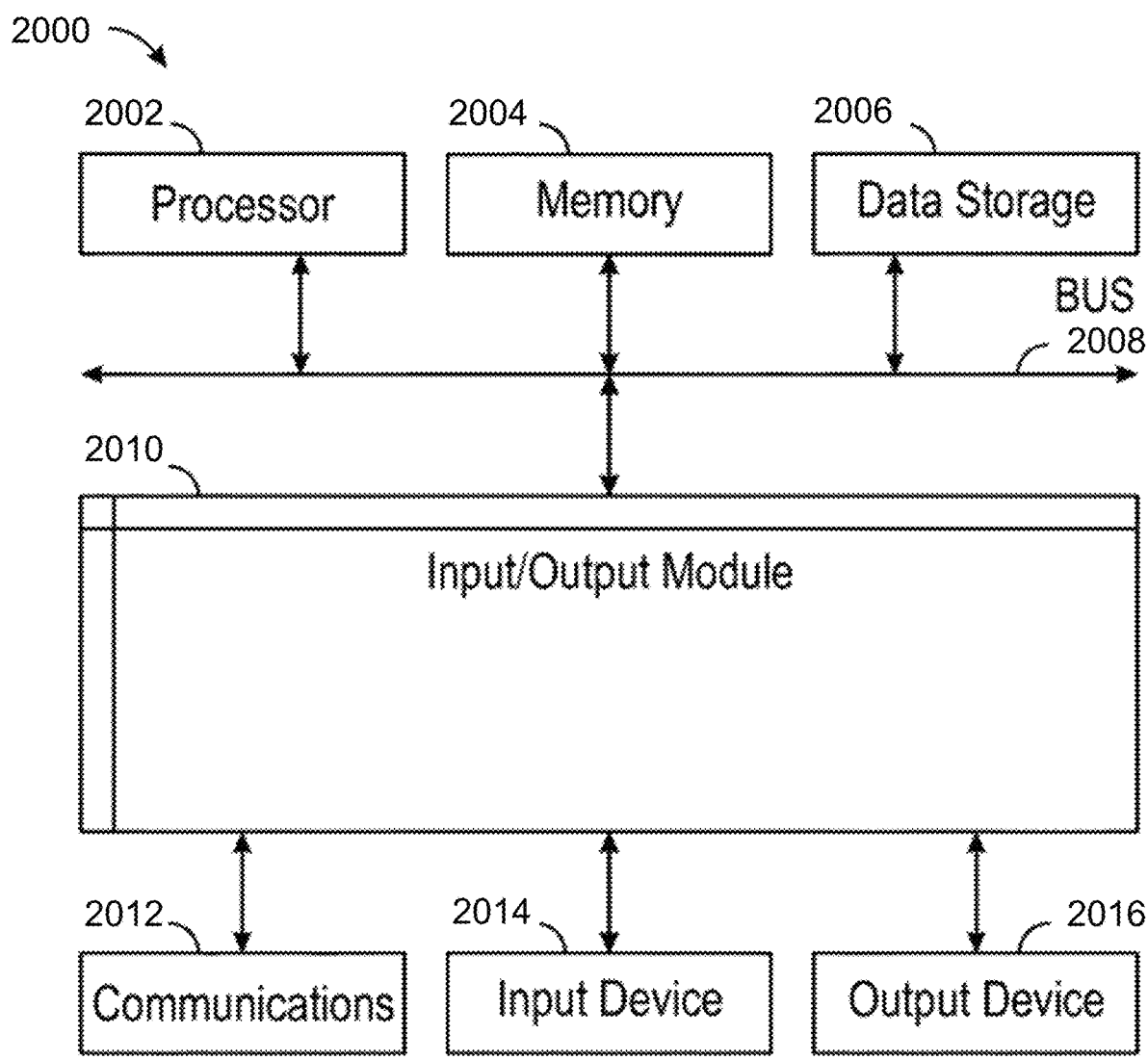
FIG. 20 is an exemplary flowchart according to an embodiment of the present disclosure.

FIG. 20 is a block diagram illustrating an example computing device 2000 for controlling an operation of the system described above, according to some embodiments. For example, the computing device 2000 may control the operations of the components forming the transaction layer 202, the data link layer 204, and/or the physical layer 206. In certain aspects, computing device 2000 can be implemented using hardware or a combination of software and hardware, either in a dedicated server, integrated into another entity, or distributed across multiple entities. Computing device 2000 may execute, in whole or in part, any or all of the processes and/or operations discussed herein.

Computing device 2000 includes a bus 2008 or other communication mechanism for communicating information, and a processor 2002 coupled with bus 2008 for processing information. By way of example, computing device 2000 can be implemented with one or more processors 2002. Processor 2002 can be a general-purpose microprocessor, a microcontroller, a Digital Signal Processor (DSP), an Application Specific Integrated Circuit (ASIC), a Field-Programmable Gate Array (FPGA), a Programmable Logic Device (PLD), a controller, a state machine, gated logic, discrete hardware components, or any other suitable entity that can perform calculations or other manipulations of information.

Computing device 2000 includes, in addition to hardware, code that creates an execution environment for the computer program in question, e.g., code that constitutes processor firmware, a protocol stack, a database management system, an operating system, or a combination of one or more of them stored in an included memory 2004, such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled to bus 2008 for storing information and instructions to be executed by processor 2002. Processor 2002 and memory 2004 can be supplemented by, or incorporated in, special purpose logic circuitry.

The instructions may be stored in memory 2004 and implemented in one or more computer program products, e.g., one or more modules of computer program instructions encoded on a computer-readable medium for execution by, or to control the operation of, the computing device 2000, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NETLIST), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, Wirth languages, embeddable languages, and WL-based languages. Memory 2004 may also be used for storing temporary variable or other intermediate information during execution of instructions to be executed by processor 2002.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computing device 2000 further includes a data storage device 2006 such as a magnetic disk or optical disk, coupled to bus 2008 for storing information and instructions.

Computing device 2000 is coupled via input/output module 2010 to various devices. The input/output module 2010 is any input/output module. Example input/output modules 2010 include data ports such as USB ports. The input/output module 2010 is configured to connect to a communications module 2012. Example communications modules 2012 include networking interface cards, such as Ethernet cards and modems. In certain aspects, the input/output module 2010 is configured to connect to a plurality of devices, such as an input device 2014 and/or an output device 2016. Example input devices 2014 include a keyboard and a pointing device, e.g., a mouse or a trackball, by which a user can provide input to the computing device 2000. Other kinds of input devices 2014 are used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Example output devices 2016 include display devices, such as an LED (light emitting diode), CRT (cathode ray tube), or LCD (liquid crystal display) screen, for displaying information to the user.

System for scheduling packets according to embodiments disclosed may be controlled by computing device 2000 in response to processor 2002 executing one or more sequences of one or more instructions contained in memory 2004. Such instructions may be read into memory 2004 from another machine-readable medium, such as data storage device 2006. Execution of the sequences of instructions contained in memory 2004 causes processor 2002 to control the system in FIG. 7 for scheduling packets. One or more processors in a multi-processing arrangement may also be employed to execute the sequences of instructions contained in memory 2004. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing device that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., Ethernet switch, and the like. For example, some aspects of the subject matter described in this specification may be performed on a cloud-computing environment. Accordingly, in certain aspects, a user of systems and circuits as disclosed herein may perform at least some of the steps by accessing a cloud server through a network connection. Further, data files, circuit diagrams, performance specifications, and the like resulting from the disclosure may be stored in a database server in the cloud-computing environment, or may be downloaded to a private storage device from the cloud-computing environment.

Computing device 2000 includes servers and personal computer devices. A personal computing device and server are generally remote from each other and typically interact through a communication network. The relationship of client and server arises by virtue of computer programs running on the respective computers and having a client-server relationship to each other. Computing device 2000 can be, for example, and without limitation, a desktop computer, laptop computer, or tablet computer. Computing device 2000 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer-readable medium" as used herein refers to any medium or media that participates in providing instructions or data to processor 2002 for execution. Such a medium may take many forms, including, but not limited to, non-volatile media, volatile media, and transmission media. Non-volatile media include, for example, optical disks, magnetic disks, or flash memory, such as data storage device 2006. Volatile media include dynamic memory, such as memory 2004. Transmission media include coaxial cables, copper wire, and fiber optics, including the wires that comprise bus 2008. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

In one aspect, a clause or a claim may be amended to include some or all of the words (e.g., instructions, operations, functions, or components) recited in other one or more clauses, one or more words, one or more sentences, one or more phrases, one or more paragraphs, and/or one or more claims.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for."

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

It will be apparent to those skilled in the art that various modifications and variations can be made in the embodiments of the present disclosure without departing from the spirit or scope of the invention. Thus, it is intended that embodiments of the present disclosure cover the modifications and variations of this invention provided they come within the scope of the appended claims and their equivalents.

What is claimed is:

1. A computer-implemented method comprising:
receiving a truncated compliance pattern associated with a Peripheral Component Interconnect Express ("PCIe") compliance mode;
identifying a communication signal associated with the truncated compliance pattern;
discarding at least one unexpected symbol on at least one lane associated with the communication signal;
collecting compliance patterns on all lanes of the communication signal;
aligning one or more lane first-in, first-out ("FIFO") buffers based upon skew; and
enabling one or more compliance pattern checkers.

2. The method of claim 1, wherein aligning includes analyzing whether expected lanes receive a delayed compliance pattern.

3. The method of claim 1, wherein aligning includes analyzing whether unexpected lanes do not receive a delayed compliance pattern.

4. The method of claim 1, further comprising:
discarding at least one compliance pattern if a delayed compliance pattern is not identified on each lane.

5. The method of claim 1, wherein aligning includes analyzing whether a lane has a greater number of symbols than permitted by a maximum skew.

6. The method of claim 1, wherein the PCIe compliance mode is 8b10b mode.

7. The method of claim 1, wherein the truncated compliance pattern is a modified compliance pattern.

8. The method claim 1, wherein the truncated compliance pattern is a normal compliance pattern.

9. The method claim 1, wherein the truncated compliance pattern is received from a re-timer device-under-test at a bus functional module ("BFM") monitor.

10. The method claim 1, wherein enabling checkers includes verifying accuracy of compliance patterns, frequency of delayed compliance patterns, and disparity of compliance pattern symbols.

11. A system comprising:
a re-timer device-under-test configured to transmit a truncated compliance pattern associated with a Peripheral Component Interconnect Express ("PCIe") compliance mode;
a bus functional module ("BFM") monitor configured to receive the truncated compliance pattern and to identify a communication signal associated with the truncated compliance pattern, the BFM monitor is further configured to discard at least one unexpected symbol on at least one lane associated with the communication signal and to collect compliance patterns on all lanes of the communication signal, the BFM monitor is further configured to align one or more lane first-in, first-out ("FIFO") buffers based upon skew and to enable one or more compliance pattern checkers.

12. The system of claim 11, wherein aligning includes analyzing whether expected lanes receive a delayed compliance pattern.

13. The system of claim 11, wherein aligning includes analyzing whether unexpected lanes do not receive a delayed compliance pattern.

14. The system of claim 11, the BFM monitor is further configured to discard at least one compliance pattern if a delayed compliance pattern is not identified on each lane.

15. The system of claim 11, wherein aligning includes analyzing whether a lane has a greater number of symbols than permitted by a maximum skew.

16. The system of claim 11, wherein the PCIe compliance mode is 8b10b mode.

17. The system claim 11, wherein the truncated compliance pattern is a modified compliance pattern.

18. The system claim 11, wherein the truncated compliance pattern is a normal compliance pattern.

19. The system claim 11, wherein enabling checkers includes verifying accuracy of compliance patterns.

20. The system claim 11, wherein enabling checkers includes verifying frequency of delayed compliance patterns and disparity of compliance pattern symbols.

* * * * *